US011378434B2

(12) United States Patent
Claeys et al.

(10) Patent No.: US 11,378,434 B2
(45) Date of Patent: Jul. 5, 2022

(54) DEVICE FOR METERING CARBON DIOXIDE SNOW

(71) Applicant: Messer Belgium N.V., Zwijndrecht (BE)

(72) Inventors: Jean-Claude Claeys, Zwijndrecht (BE); Gerrit Schuddinck, Grimbergen (BE)

(73) Assignee: Messer Belgium N.V., Zwijndrecht (BE)

(*) Notice: Subject to any disclaimer, the term of this patent is extended or adjusted under 35 U.S.C. 154(b) by 185 days.

(21) Appl. No.: 16/640,651

(22) PCT Filed: Aug. 7, 2018

(86) PCT No.: PCT/EP2018/071431
§ 371 (c)(1),
(2) Date: Feb. 20, 2020

(87) PCT Pub. No.: WO2019/048162
PCT Pub. Date: Mar. 14, 2019

(65) Prior Publication Data
US 2020/0355533 A1 Nov. 12, 2020

(30) Foreign Application Priority Data
Sep. 9, 2017 (DE) .......................... 102017008488.2

(51) Int. Cl.
*F25D 3/12* (2006.01)
*G01F 11/28* (2006.01)
*F25D 29/00* (2006.01)

(52) U.S. Cl.
CPC .............. *G01F 11/282* (2013.01); *F25D 3/12* (2013.01); *F25D 29/001* (2013.01); *F25D 2400/30* (2013.01)

(58) Field of Classification Search
CPC ...... F25D 3/12; F25D 29/001; F25D 2400/30; G01F 11/282
See application file for complete search history.

(56) References Cited

U.S. PATENT DOCUMENTS 1,795,772 A 3/1931 Goosmann
2,120,943 A * 6/1938 Schutz .................... C01B 32/55
62/604

(Continued)

FOREIGN PATENT DOCUMENTS

CS 225663 B1 * 2/1984
CS 225663 B1 2/1984

(Continued)

OTHER PUBLICATIONS

English Translation of CS 225663 (Year: 1979).*

(Continued)

*Primary Examiner* — David J Teitelbaum
(74) *Attorney, Agent, or Firm* — Andrus Intellectual Property Law, LLP

(57) ABSTRACT

The invention relates to a device for metering carbon dioxide snow, comprising a storage container and a discharge opening arranged in the base of the storage container. A horizontally and vertically movable base, by means of which the discharge opening can be opened and closed, is arranged in the region of the discharge opening. A horizontally movable cutting knife is vertically spaced from the base and can be moved into the interior of the storage container. Once the storage container is filled with carbon dioxide snow a metered amount of carbon dioxide snow present between the cutting knife and the base is cut off by the cutting knife and compacted by vertical movements of the base and is then discharged by the base moving into the open position.

18 Claims, 5 Drawing Sheets

(56) References Cited

U.S. PATENT DOCUMENTS

| | | | |
|---|---|---|---|
| 2,145,096 A | | 1/1939 | Schutz |
| 2,253,880 A | | 8/1941 | Zteber |
| 3,757,367 A | * | 9/1973 | Campbell ............... C01B 32/55 |
| | | | 62/603 |
| 4,145,894 A | * | 3/1979 | Frank ..................... F25D 3/12 |
| | | | 222/146.6 |
| 4,415,346 A | | 11/1983 | Love |
| 4,624,163 A | * | 11/1986 | Grace .................... A23G 9/227 |
| | | | 493/290 |
| 6,003,916 A | * | 12/1999 | Chalmers ................ E01H 5/10 |
| | | | 294/54.5 |
| 6,012,660 A | * | 1/2000 | Colman ................... F25C 5/12 |
| | | | 241/100 |
| 2014/0332612 A1 | * | 11/2014 | Liao ........................ F25C 5/12 |
| | | | 241/65 |

FOREIGN PATENT DOCUMENTS

| | | |
|---|---|---|
| EP | 0478316 B1 | 4/1994 |
| EP | 1188715 A1 | 3/2002 |
| EP | 2363377 A1 | 9/2011 |
| FR | 2518723 A1 | 6/1983 |
| GB | 294584 A | 10/1929 |

OTHER PUBLICATIONS

International Search Report and Written Opinion issued in corresponding PCT Application No. PCT/EP2018/071431, dated Oct. 26, 2018.

* cited by examiner

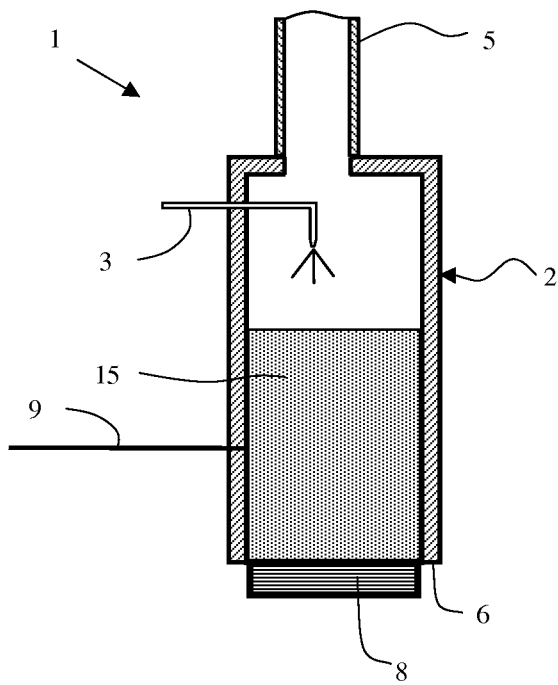
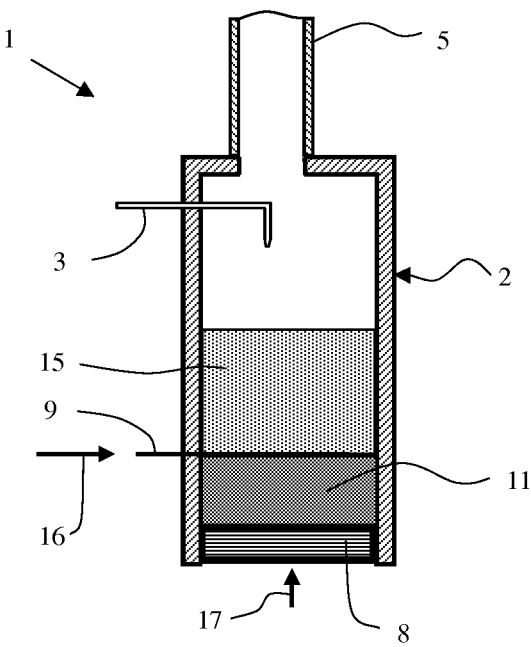
Fig. 2a                Fig. 2b
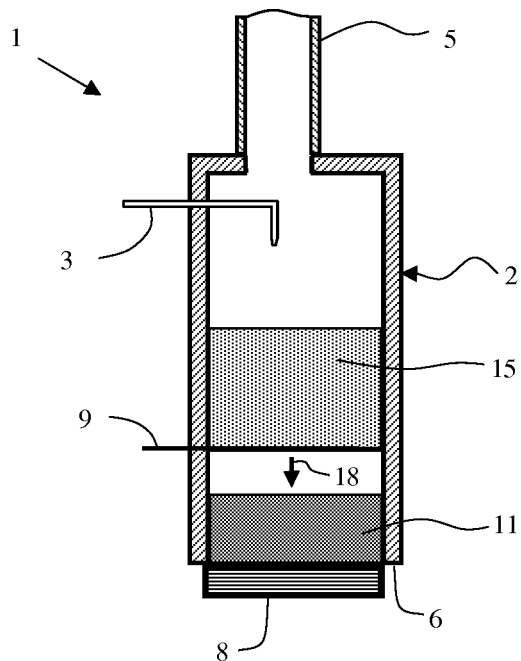
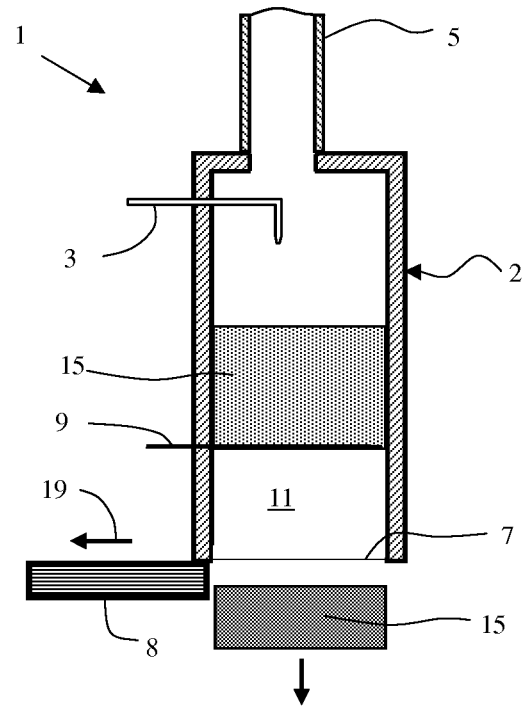
Fig. 2c                Fig. 2d

DEVICE FOR METERING CARBON DIOXIDE SNOW

CROSS-REFERENCE TO RELATED APPLICATIONS

This application is the U.S. national stage application of International Application PCT/EP2018/071431, filed Aug. 7, 2018, which international application was published on Mar. 14, 2019, as International Publication WO 2019/048162 in the German language. The international application is incorporated herein by reference, in entirety. The international application claims priority to German Patent Application No. 10 2017 008 488.2, filed Sep. 9, 2017, which is incorporated herein by reference, in entirety.

FIELD

The invention relates to an apparatus for metering carbon dioxide snow, with a feed container, into which a feed line for liquid or snowy carbon dioxide and a gas vent line for discharging carbon dioxide gas open, and which has a discharge opening which is arranged on the bottom side, and which is equipped with at least one dividing knife which is arranged spaced apart from the discharge opening and can be moved from a first position which separates the interior space of the feed container into two part volumes, into a second position which is spaced apart laterally from the interior space of the feed container.

BACKGROUND

In order for it to be possible for the surfaces, in particular, of foodstuff products to be frozen rapidly, they are sprayed with a cryogenic refrigerant, for example with carbon dioxide snow. Here, the treatment preferably takes place in a freezing tunnel by means of injection nozzles or what are known as snow horns.

In snow horns, the generation of carbon dioxide snow takes place by way of expansion of liquid carbon dioxide with utilization of the Joule-Thomson effect. Here, the snow horn comprises an expansion member in the form of a nozzle which is usually arranged in the head section of the snow horn above a perpendicularly arranged funnel. Pressurized, liquid carbon dioxide is expanded at the expansion nozzle to a pressure of below 5.18 bar, for example 1 bar, a mixture of carbon dioxide gas and carbon dioxide snow being produced. The carbon dioxide snow falls under the action of gravity in the funnel onto a surface to be cooled. In the case of the use of snow horns of this type, however, the strong current of the carbon dioxide gas which is generated at the same time in the case of the expansion leads to swirling of the light snow particles and therefore to wide scattering of the snow particles in front of the orifice opening of the snow horn. As a result, the problem is produced, in particular, that the snow particles are distributed only very inhomogeneously on the product to be cooled and therefore lead to an inhomogeneous cooling effect. In addition, a not inconsiderable proportion of the snow particles is guided past the product, as a result of which a greater snow quantity has to be generated than corresponds to the quantity which is actually required for cooling purposes.

Attempts have already been made to focus the snow particles to a more pronounced extent with the aid of mechanical devices, such as funnels or guide plates, as described, for example, in EP 1 188 715 A1, U.S. Pat. No. 4,415,346 A or GB 294 584 A.

EP 2 363 377 A1 has disclosed a snow horn, in the case of which a conveying worm is arranged between an expansion chamber and a discharge opening. The conveying worm ensures a division of the gas stream which is generated in the case of the expansion from the carbon dioxide snow, and transports the carbon dioxide snow precisely to the location of use. As a result, carbon dioxide snow can be fed to a consumer without swirling by way of the gas stream. However, the feeding of the carbon dioxide takes place continuously; said apparatus is suitable only to a limited extent for the targeted cooling of individual products which are conveyed through a cooling tunnel, for example, on a conveyor belt.

U.S. Pat. No. 4,145,894 A has disclosed an apparatus for distributing carbon dioxide snow onto product surfaces to be cooled, which apparatus is intended to make precise metering of the carbon dioxide snow possible. Here, a rotary valve is arranged on the bottom of a feed container, in which carbon dioxide snow is obtained by way of expansion of liquid carbon dioxide, by means of which rotary valve carbon dioxide snow from the feed container can be applied in predefined quantities to a product which lies underneath.

EP 0 478 316 B1 describes an apparatus for treating foodstuff products with carbon dioxide snow, in the case of which apparatus the bottom of a feed container which is equipped with a feed means for liquid carbon dioxide is equipped with a perforated plate and with a wire fabric which is stretched over the perforated plate. The wire fabric retains the carbon dioxide snow in the feed container, which carbon dioxide snow is generated in the case of the expansion of the liquid carbon dioxide. During use of the apparatus, carbon dioxide snow is pressed by means of a wiper through the mesh of the wire fabric and the openings of the perforated plate, which carbon dioxide snow subsequently falls onto the surface of the product to be treated.

U.S. Pat. No. 1,795,772 B describes an apparatus for generating compact blocks consisting of dry ice, in the case of which carbon dioxide snow which is generated in a snow horn is fed to a vertically arranged cylinder with a predefined volume, in which cylinder the snow is compressed by means of a piston and the compressed snow is subsequently ejected laterally.

In the case of all these subjects, however, there is the risk that carbon dioxide snow or freezing moisture from the ambient atmosphere settles on parts of the apparatus, as a result of which precise metering of the carbon dioxide snow quantity is prevented, or the functional capability of the apparatus is even impaired.

U.S. Pat. No. 2,120,943 B describes an apparatus, in which carbon dioxide snow is pressed to form dry ice blocks. Here, carbon dioxide snow falls into a perpendicularly situated feed container. By means of two horizontally movable circular saws, a part quantity of the snow is separated, and the divided snow is subsequently fed to a piston arrangement which adjoins the feed container on the underside and in which the snow is pressed to form a block of hard dry ice. Said apparatus has a very complicated construction and handling, however, and is not suitable for applying carbon dioxide snow in a respective precisely metered quantity onto a product to be cooled in rapid succession.

SUMMARY

It is an object of the invention to provide an apparatus for providing a quantity which is metered as precisely as possible of carbon dioxide snow which is not compressed to form ice, in the case of which apparatus the risk of the functional capability being impaired by way of caking of carbon dioxide snow or freezing of moisture is minimized Said object is achieved by way of an apparatus having the features of patent claim 1.

An apparatus of the type and intended use mentioned at the outset is therefore characterized in that the discharge opening is assigned a horizontally and vertically movable bottom which has an external cross section which corresponds to the internal cross section of the discharge opening, and which bottom can be moved between a first position, in which the discharge opening of the feed container is released and the bottom is arranged laterally on the feed container, a second position, in which the bottom closes the discharge opening at the level of its orifice in a snow-tight manner, and a third position, in which the bottom is introduced to a limited extent into the discharge opening of the feed container.

A feed line which is connected to a source for carbon dioxide opens in the interior of the vertically arranged, preferably cylindrical feed container. The feed line is, for example, a feed line for liquid carbon dioxide, which feed line opens in the interior of the feed container at an expansion nozzle, and at which a mixture consisting of carbon dioxide snow and carbon dioxide gas is generated by way of expansion of the liquid carbon dioxide. On its lower end side, the feed container has a discharge opening for carbon dioxide snow, which discharge opening takes up the area of the end side at least partially, but preferably largely completely. The feed container, but at least the discharge opening, has a round or rectangular, in particular square cross section. Furthermore, a gas vent line for discharging carbon dioxide gas which is produced opens from an upper section of the feed container.

The bottom is preferably a disk-shaped element which can be displaced or pivoted horizontally and vertically and is adapted to the size and shape of the discharge opening in such a way that it can be introduced at least to a limited extent into the interior of the feed container. The bottom can be moved between three positions in the way which is described in the following text.

In its first position, the bottom is situated laterally next to the discharge opening, preferably in such a way that an upper side face of the bottom is substantially flush with the discharge opening at its orifice on the feed container.

In order to move from the first into the second position, the bottom is moved horizontally in the direction of the discharge opening. In the second position of the bottom, its upper side face is positioned directly in front of the orifice of the discharge opening and covers the latter completely, with the result that carbon dioxide snow which is fed to the feed container or is generated in the latter cannot escape or can only escape to a not noteworthy extent from the discharge opening. When the bottom is in said position, carbon dioxide snow which is fed to the feed container accumulates above the bottom in the feed container and forms a snow column, the height of which in the case of continuous feeding of carbon dioxide snow rapidly exceeds the vertical position of the dividing knife. The snow column in the interior of the feed container can be cut through by means of the dividing knife, and a precisely defined snow quantity which is situated in the feed container between the bottom and the dividing knife can thus be divided.

In its third position, the bottom is displaced vertically upward into the interior of the discharge opening. As a result of said displacement, the carbon dioxide snow which is situated between the bottom and the dividing knife is compressed to form a dimensionally stable snow body with a density of 50-800 kg/m$^3$, preferably 200-800 kg/m$^3$, but not to such an extent that the formation of a hard dry ice block (with a density of above 800 kg/m$^3$) occurs. The compression prevents the snow body from falling apart in the case of feeding onto a surface or onto a coolant storage compartment, and thus makes it possible that the snow can be fed to its location of use in a targeted manner and without substantial losses. In order to remove the snow body from the apparatus, the bottom is returned from the third position first of all into the second position, and subsequently into the first position, in which the bottom is arranged to the side of the discharge opening. The snow body then falls perpendicularly out of the discharge opening which is then open.

The dividing knife which is arranged above the bottom is an element which can be displaced or pivoted horizontally into the interior of the feed container, for example a thin, dimensionally stable plate, the front side of which, which faces the interior of the feed container, can be of blade-like configuration. The dividing knife can be moved by means of a drive from a first position (also called "open position" here), in which the dividing knife is situated outside the interior of the feed container, into a second position (also called "closed position" here), in which the dividing knife shuts off the cross section of the interior of the feed container in a snow-tight manner and in the process severs carbon dioxide snow, which is situated in that section of the feed container which is situated below the dividing knife (also called "metering section" here), from the remaining carbon dioxide snow above the dividing knife.

In one particularly advantageous refinement of the invention, the dividing knife and/or the bottom and/or the walls of the feed container are/is equipped with a heating device which is preferably electric. The heating device is, for example, an arrangement of a plurality of heating rods which are arranged parallel to one another in the dividing knife the bottom, and/or heating wires or heating elements which are arranged in corresponding leadthroughs or grooves in the walls of the feed container. The heating performance of the heating devices is dimensioned in each case in such a way that said heating device is capable of evaporating directly adhering snow and thus releasing the snow body which is produced from the dividing knife, the bottom and/or the wall. As a result, in particular, it is ensured that no carbon dioxide snow is caked on and remains in the feed container. The heating thus makes very precise metering of the carbon dioxide snow possible, since the snow which is generated can be fed almost completely to its location of use with great reliability.

One particularly advantageous refinement of the invention provides that the vertical spacing between the bottom and the dividing knife is variable. To this end, for example, the feed container comprises two sections which can be displaced vertically with respect to one another, the bottom being arranged in a lower section and a dividing knife being arranged in an upper section. By way of the displacement of the two sections with respect to one another, the vertical spacing between the bottom and the dividing knife (and therefore the volume of the metering section) can be changed in an infinitely variable manner. The movement of the two sections with respect to one another takes place manually or in a manner which is driven by motor. In one particularly preferred refinement, the two sections of the feed container engage telescopically over one another and can be displaced with respect to one another along their common longitudinal axis in an infinitely variable manner.

In a likewise expedient embodiment of the invention, the feed container is equipped with two or more dividing knives which are arranged spaced apart from one another vertically and can be moved independently of one another. By way of a plurality of dividing knives, the quantity of discharged carbon dioxide snow can be changed in a targeted manner and can be adapted to the respective requirements. In this way, in particular, the snow quantity can be adapted to the refrigeration requirement of the respective cooling task, without it being necessary for the apparatus to be modified in a complicated manner to this end. It goes without saying that all of said dividing knives can also be equipped with heating devices, in order to prevent caking of carbon dioxide snow.

The dividing knife or knives and/or the bottom are/is advantageously equipped with drives which are actuated by a control unit. The control unit ensures the coordinated actuation of the drives and, for this purpose, is data-connected to suitable sensors, by way of which it is determined whether the preconditions for the actuation of a drive are present. For example, the actuation of the dividing knife takes place in a manner which is dependent on the snow height in the feed container. Here, the dividing knife is moved into its closed position only when the snow column which grows in the feed container as a result of the feed of carbon dioxide snow has grown beyond the vertical position of the dividing knife, which is determined by way of a corresponding sensor. The control unit can also ensure that the vertical movement of the bottom into the discharge opening takes place only after the dividing knife has reached its closed position, which is likewise determined by way of a corresponding sensor.

Two drives are preferably provided for moving the bottom, the actuation of which drives is preferably controlled by the control unit. One of the drives which are actuated, for example, electrically, pneumatically or hydraulically brings about the horizontal movement of the bottom here from the first into the second position and back, and the second drive ensures the vertical movement of the bottom from the second position into the third position and back.

The internal cross section of the discharge opening is expediently adapted to the surface, on which the carbon dioxide snow is to be applied. Here, one preferred refinement provides that the internal cross section of the discharge opening and therefore the external cross section of the bottom are of rectangular, in particular square, configuration.

The apparatus according to the invention is used, for example, for bringing product surfaces to a low temperature, or for keeping them at a low temperature, for instance for the duration of transport. One particularly preferred use consists in cooling or keeping cold of foodstuff products, for example dough, meat, fish, fruit and vegetables, but the invention is not restricted thereto. Rather, other products, for example chemical or pharmaceutical products, can also be cooled, or can be kept at a low temperature. The apparatus according to the invention can also be arranged, in particular, in a cooling tunnel, in order to load product surfaces with carbon dioxide snow.

In another preferred use, the apparatus according to the invention is part of an apparatus for filling coolant storage compartments of cooling containers with carbon dioxide snow, in particular for cooling foodstuffs during transport, and serves here for portioning the carbon dioxide snow which is used as coolant. The snow body which is generated by way of the apparatus according to the invention and consists of compressed carbon dioxide snow is filled into the storage compartment of the cooling container by way of a feeding device. In the simplest case, the feeding device is a channel which is arranged in an inclined manner below the discharge opening and has at least the same width as the discharge opening. During operation of the apparatus, the snow body which is generated by means of the apparatus according to the invention falls into the channel and slides through the latter into the storage compartment to be filled, premature breaking apart of the snow body largely being avoided by way of the compression of the snow. The great surface area of the merely compressed snow body which is not, however, pressed to form a compact ice block aids a satisfactory thermal transfer within the storage compartment, in contrast.

BRIEF DESCRIPTION OF THE DRAWINGS

Exemplary embodiments of the invention are to be described in greater detail on the basis of the drawings, in which, in diagrammatic views:

FIGS. 2a to 2f show various work steps during operation of the apparatus from FIG. 1 in schematic views.

DETAILED DESCRIPTION

Figure 1:
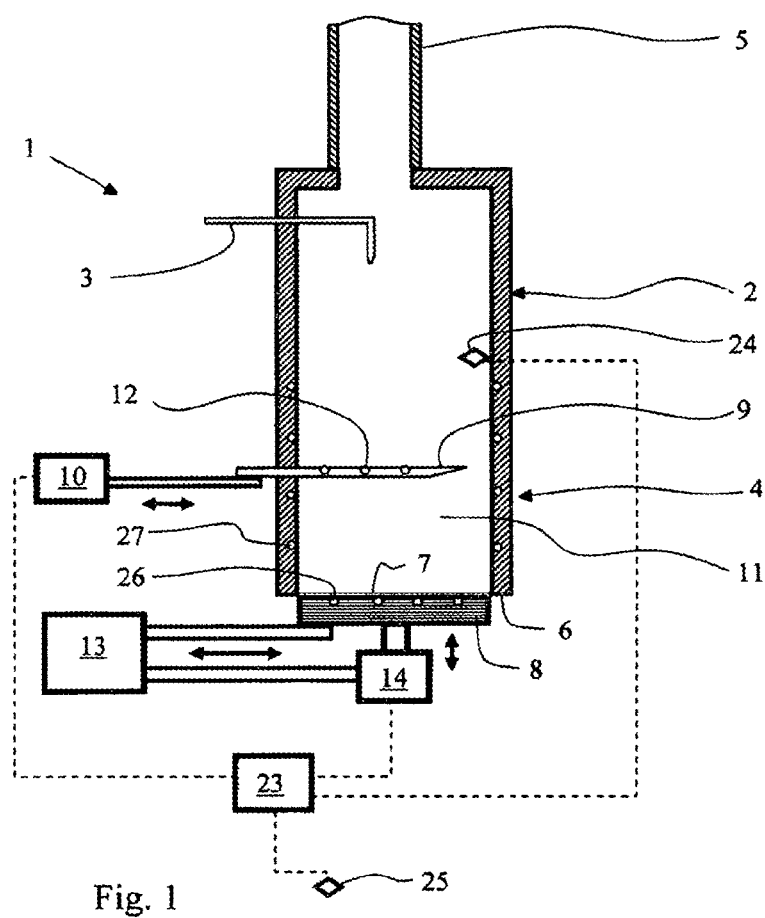
FIG. 1 shows a schematic view of an apparatus according to the invention.

The apparatus 1 which is shown in FIG. 1 comprises a vertically arranged feed container 2 with walls which are satisfactorily insulated thermally. A feed line 3 for feeding in liquid carbon dioxide opens into the interior of the feed container 2, at the end of which feed line 3 an expansion nozzle is arranged. Instead of the feed line 3 which is shown here for liquid carbon dioxide, a feed means for carbon dioxide snow is also directly conceivable within the context of the invention, for example of the type as described in EP 2 363 377 A1. A plurality of feed lines for liquid carbon dioxide and/or carbon dioxide snow are also possible. A discharge opening 7 opens on the lower end side 6 of the feed container 2, and a gas vent line 5 is arranged in the upper region of the feed container 2.

In the way which is described in greater detail below, the discharge opening 7 interacts with a horizontally and vertically movably arranged bottom 8, the external cross section of which is adapted to the internal cross section of the discharge opening 7. The discharge opening 7 can be adjoined (not shown here) by a metering funnel or a channel arrangement for feeding in the carbon dioxide snow which is generated in the apparatus 1 to its location of use, which is, for example, a product surface to be cooled or a coolant storage compartment of a cooling container.

A horizontally displaceable or pivotable dividing knife 9 is arranged spaced apart vertically from the end side 6, which dividing knife 9 is, for example, a thin metal sheet or a plate made from metal or plastic. Here, that edge of the dividing knife 9 which faces the interior of the feed container can be of blade-like configuration. The dividing knife 9 can be displaced or pivoted with the aid of a drive unit 10 which is, for example, driven electrically, from an open position, in which the dividing knife 9 is situated outside the interior of the feed container 2, horizontally into a closed position, in which the dividing knife 9 is pushed into the interior of the feed container 2. In said second position, it divides the interior of the feed container 2 into two part volumes, a lower part volume which extends between the dividing knife 9 and the bottom 8 defining a metering section 11. The dividing knife 9 is equipped with a heating device 12, which is a plurality of electric heating rods which are arranged parallel to one another in the dividing knife 9 in the exemplary embodiment.

As has already been mentioned, the bottom 8 is arranged such that it can be moved both in the horizontal and in the vertical regard. To this end, the bottom 8 is equipped with a horizontal drive 13 and with a vertical drive 14. The drives 13, 14 are, for example, electric, pneumatic or hydraulic drives. The horizontal drive 13 makes a horizontal movement of the bottom 8 possible between a first position, in which the bottom 8 is situated laterally on the feed container 2, and a second position, in which the bottom 8 is situated with its upper side precisely below the discharge opening 7 and in the process is approximately flush with the end side 6 of the feed container 2. In said second position which is shown in FIG. 1, the bottom prevents the discharge of carbon dioxide snow from the feed container 2. The vertical drive 14 makes a limited vertical movement of the bottom 8 possible from the abovementioned second position into the discharge opening 7 and out of the latter again.

FIGS. 2 *a-f* show various operating states of the apparatus 1. In the operating state which is shown in FIG. 2*a*, the upper side of the bottom 8 terminates flush with the end side 6 of the feed container 2, and in the process closes the discharge opening 7 in a snow-tight manner. Carbon dioxide snow 15 is fed continuously to the feed container 2. This takes place by way of the feed of liquid carbon dioxide at a pressure of, for example, 15 bar, from a tank (not shown here) via the feed line 3. At an expansion nozzle which is mounted at the end of the feed line 3, the liquid carbon dioxide is expanded to a pressure of below 5.18 bar, preferably to atmospheric pressure (1 bar), and in the process turns into a mixture of carbon dioxide snow and carbon dioxide gas.

In the operating state which is shown in FIG. 2*a*, the dividing knife 9 is arranged to the side of the interior of the feed container 2. By way of continuous generation or feeding of snowy carbon dioxide, the interior of the feed container 2 above the bottom 8 is filled gradually with carbon dioxide snow 15 as far as beyond the vertical position of the dividing knife 9. At the same time, carbon dioxide gas which is produced by way of expansion or sublimation is discharged via the gas vent line 5.

By way of actuation of the drive unit 10, the dividing knife 9 is moved in the direction of the arrow 16 into its closed position (FIG. 2*b*). As a result, the carbon dioxide snow 15 which is situated in the metering section 11 of the feed container 2 is separated from the remaining carbon dioxide snow 15 which is situated within the feed container 2. By way of actuation of the vertical drive 14, the bottom 8 is pushed into the discharge opening 7 by a limited distance in the direction of the arrow 17. As a result, the carbon dioxide snow 15 which is situated between the bottom 8 and the dividing knife 9 is solidified to form a snow body of elevated density of, for example, 200-800 kg/m$^3$, but is not pressed to form a dry ice block.

By way of actuation of the vertical drive 14 in the opposite direction, the bottom 8 is subsequently moved downward again into the previous position, in which its upper side is flush with the end side 6 of the feed container 2 (FIG. 2*c*). The snow body which is situated in the metering section 11 and consists of compressed carbon dioxide snow follows the bottom 8 under the action of gravity, as indicated by way of the arrow 18. Here, the heating device 12 ensures that no carbon dioxide snow remains adhering to the underside of the dividing knife 9.

By way of actuation of the horizontal drive 13 in the direction of the arrow 19, the bottom 8 is subsequently horizontally moved into a position which is spaced apart from the discharge opening 7, and the discharge opening 7 is released as a result (FIG. 2*d*). As a result, the carbon dioxide snow 15 which is situated in the metering section 11 falls out of the feed container 2, while the remaining carbon dioxide snow 15 is retained in the feed container 2 by way of the dividing knife 9. The ejected carbon dioxide snow falls, for example, directly onto a product to be cooled or into a container, or is fed to a device (not shown here) for feeding it to a product or refrigerator compartment.

Figure 2E:
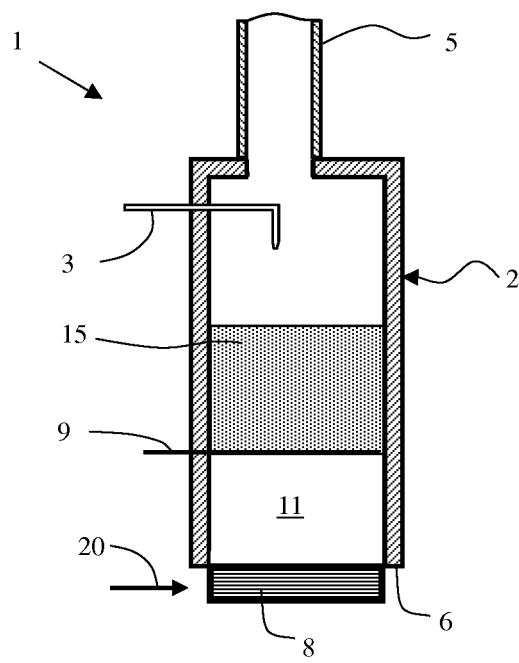
Figure 2F:
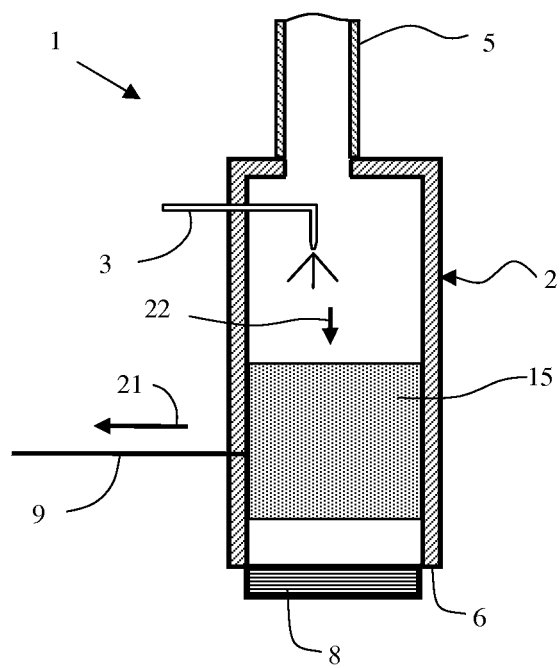

By way of renewed actuation of the drive unit 9, the bottom 8 is subsequently moved again in the direction of the arrow 20 into the position, in which its upper side just covers the discharge opening 7 (FIG. 2*e*). As a result, the discharge opening 7 is closed in a snow-tight manner Subsequently, by way of actuation of the drive unit 10, the dividing knife 9 is moved in the direction of the arrow 21 into its open position (FIG. 2*f*), and carbon dioxide snow 15 falls out of the upper part of the feed container 2 into the metering section 11, as indicated by way of arrow 22. The carbon dioxide snow which is discharged via the discharge opening 7 is supplemented by way of continuous feeding or continuous generation at the feed line 3, whereby the operating state which is shown in FIG. 2*a* is reached again.

The drive units 10, 13, 14 and a valve (not shown here) which controls the feed of the carbon dioxide via the feed line 3 are data-connected to a control unit 23, by means of which the actuation of the drive units 10, 13, 14 can be automated. Moreover, the control unit 23 can be data-connected to sensors 24, 25, by means of which data which are relevant for the operation of the apparatus 1 are detected, for example the filling height of carbon dioxide snow 15 in the feed container 2 (sensor 24) or the presence of a product to be loaded with carbon dioxide snow or a coolant compartment to be filled below the apparatus 1 (sensor 25).

The bottom 8 is also optionally equipped with a heating device 26, in order to prevent caking of carbon dioxide snow on the bottom 8 and therefore to ensure that substantially the entire snow quantity which is present in the metering region 11 is fed to the location of use. The heating device 26 is constructed in a similar way to the heating device 12 and comprises, for example, a plurality of electric heating rods which are arranged parallel to one another in the bottom 8 and heat at least the entire upper side of the bottom 8, which upper side faces the discharge opening 7, to such an extent that a thin layer of carbon dioxide snow which adheres directly on the bottom 8 sublimes, with the result that the remaining snow is released from the bottom 8 in the case of the horizontal movement of said bottom 8 with respect to the end side 6.

In the exemplary embodiment which is shown, the walls of the feed container 2 are also equipped with a heating device 27 which has the task of preventing caking of carbon dioxide snow on the walls of the feed container 2. Just like the heating devices 12, 26, the performance of the heating device 27 is dimensioned in such a way that only a thin layer on the surface of the snow body is brought to a temperature just above the sublimation point and, as a result, snow particles which adhere to the wall are detached. The heating device 27 comprises, for example, electric heating rods or heating wires which are fitted into corresponding grooves or leadthroughs in the walls of the feed container, in order that they do not impede the snow body when falling out of the feed container 2.

Figure 3:
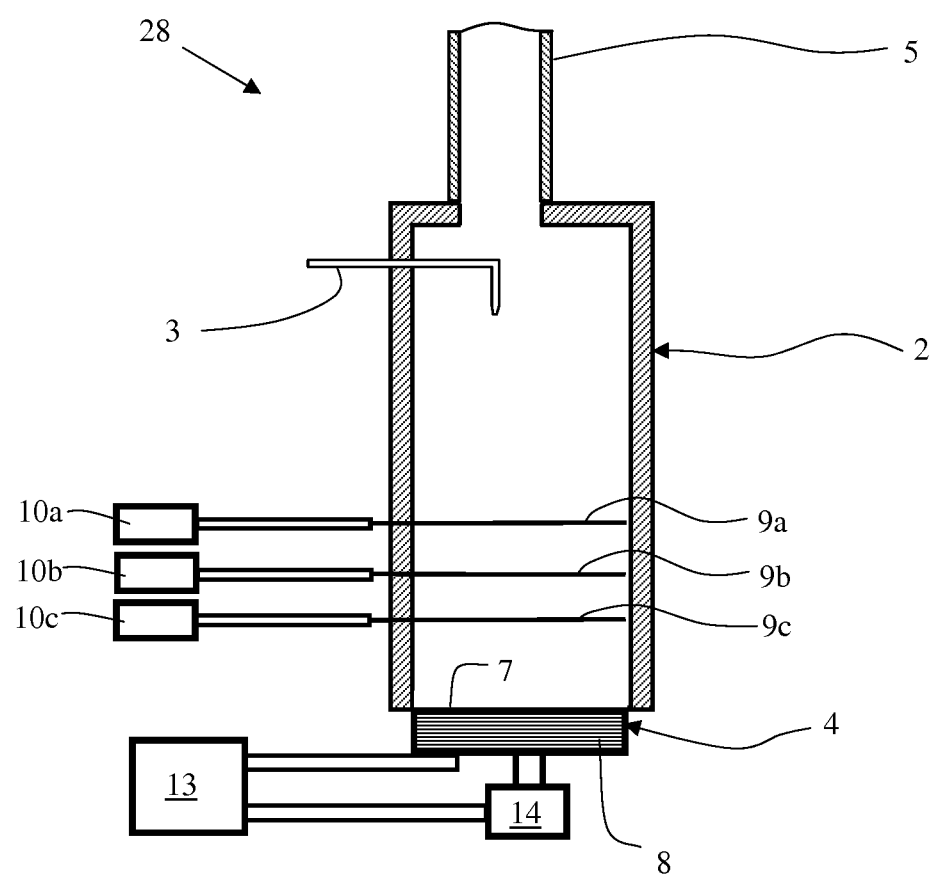
FIG. 3 shows a schematic view of an apparatus according to the invention in another embodiment.

In that embodiment of an apparatus 28 according to the invention which is shown in FIG. 3, identically acting constituent parts are labeled by way of the same designations as in apparatus 1. The apparatus 28 differs from the apparatus 1 merely in that, instead of a single dividing knife 9, a plurality of (in the exemplary embodiment, three) dividing knives 9a, 9b, 9c are provided which are arranged in each case spaced apart vertically from one another. The dividing knives 9a, 9b, 9c which are of structurally identical configuration to the dividing knife 9 can be moved independently of one another by means of drive units 10a, 10b, 10c.

The plurality of dividing knives 9a, 9b, 9c makes a variation of the metering quantity of the carbon dioxide snow possible. Depending on the intended quantity, one of the dividing knives 9a, 9b or 9c is selected, in order to separate the carbon dioxide snow which is situated in the feed container 2. The metering quantity corresponds in each case to the quantity of carbon dioxide snow in the volume between the bottom 8 and the respectively selected dividing knife 9a, 9b, 9c.

Figure 4:
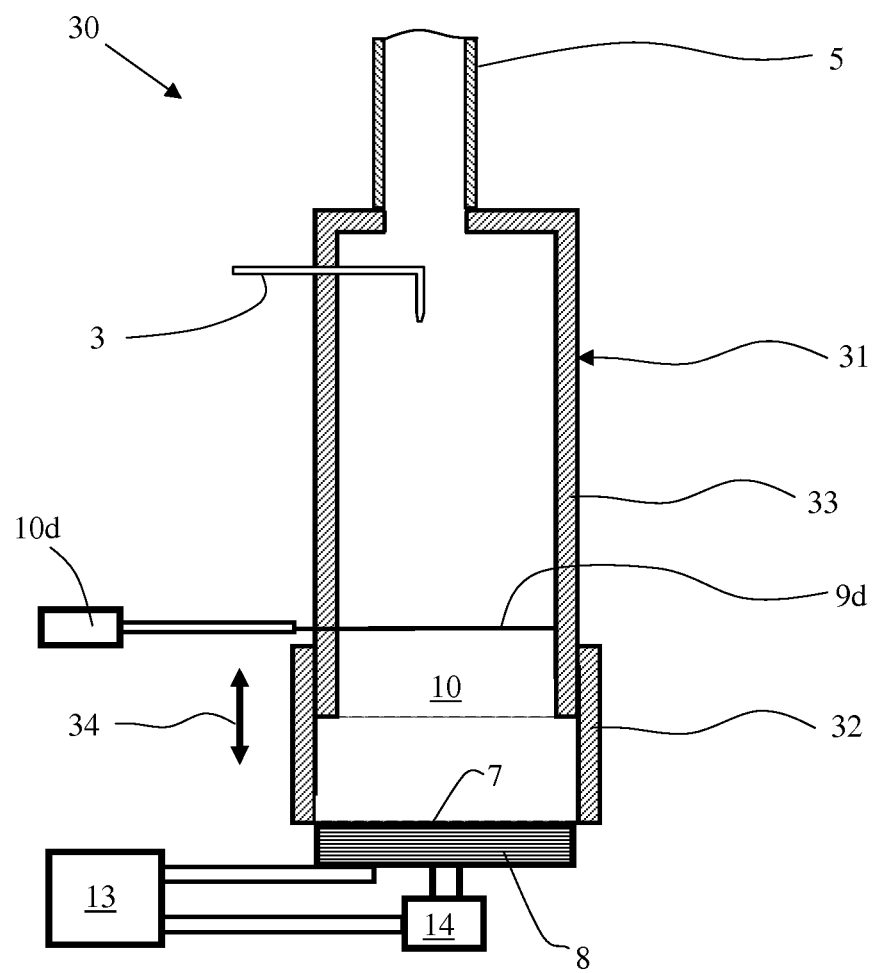
FIG. 4 shows a schematic view of an apparatus according to the invention in yet another embodiment.

The apparatus 30 which is shown in FIG. 4 makes an infinitely variable setting of the metering quantity of the carbon dioxide snow possible. Here, identically acting constituent parts are also labeled with the same designations as in the apparatuses 1 and 28. The apparatus 30 has a supply container 31 which is divided into two sections 32, 33 which are configured such that they can be displaced into one another telescopically, as indicated by way of the arrow 34, the upper section 33 being pushed over the lower section 32 in the case of the apparatus 30 being pushed together in the exemplary embodiment which is shown. A bottom 8 is arranged in the lower section 32, and a dividing knife 9d which is equipped with a drive 10d is arranged in the upper section 33. In the case of the apparatus 30, the bottom 8 and the dividing knife 9d are constructed in the same way as the bottom 8 and the dividing knives 9, 9a, 9b, 9c from FIG. 1 and FIG. 3. In order to set the quantity to be discharged of carbon dioxide snow, the lower section 32 is displaced with respect to the upper section 33 until that volume between the bottom 8 and the dividing knife 9d which represents the metering section 11 in the case of the apparatus 30 is sufficient to receive the desired quantity of carbon dioxide. The displacement of the two sections 32, 33 with respect to one another takes place in an infinitely variable manner, and can take place manually or by means of a drive unit (not shown here). It goes without saying that it is also possible to configure an apparatus which corresponds to the apparatus 30, in such a way that the lower section which has the bottom 8 has a greater diameter than the upper section and is pushed over said upper section when the apparatus is pushed together.

The invention makes accurate metering of a quantity of carbon dioxide snow possible in comparison with corresponding apparatuses from the prior art, and has a low susceptibility to faults on account of caking of snow or water ice bodies which form. The apparatus according to the invention makes it possible, in particular, to fill a plurality of coolant compartments of transport containers in rapid succession, which transport containers are provided for the transport of products to be cooled. The invention is suitable, in particular, for metering quantities of carbon dioxide snow of, for example, above 100 g, preferably above 500 g, which quantities are to be discharged periodically in short time intervals of a duration of a few seconds, for example at a time interval of from 0.5 to 5 seconds. In addition, the carbon dioxide gas which is generated at the same time as the carbon dioxide snow is discharged immediately after it is produced, without mixing with a surrounding atmosphere. It is therefore of high purity and can be used further or recycled without problems.

LIST OF DESIGNATIONS

1 Apparatus
2 Feed container
3 Feed line
4 —
5 Gas vent line
6 Lower end side
7 Discharge opening
8 Bottom
9,9a,9b,9c,9d Dividing knife
10,10a,10b,10c,10d Drive unit
11 Metering section
12 Heating device
13 Horizontal drive
14 Vertical drive
15 Carbon dioxide snow
16 Arrow
17 Arrow
18 Arrow
19 Arrow
20 Arrow
21 Arrow
22 Arrow
23 Control unit
24 Sensor
25 Sensor
26 Heating device
27 Heating device
28 Apparatus
29 —
30 Apparatus
31 Supply container
32 Lower section
33 Upper section
34 Arrow

The invention claimed is:

1. An apparatus for metering carbon dioxide snow comprising:
a feed container, into which a feed line for liquid or snowy carbon dioxide and a gas vent line for discharging carbon dioxide gas open, and which has a discharge opening which is arranged on the bottom side, and which is equipped with at least one dividing knife which is arranged spaced apart from the discharge opening and can be moved from a first position which separates an interior space of the feed container into two part volumes, into a second position which is spaced apart laterally from the interior space of the feed container;
wherein the discharge opening is assigned a horizontally and vertically movable bottom which has an external cross section which corresponds to an internal cross section of the discharge opening, and which bottom can be moved between a first position, in which the discharge opening is released and the bottom is arranged laterally on the feed container, a second position, in which the bottom closes the discharge opening at the level of its orifice, and a third position, in which the bottom is introduced to a limited extent into the discharge opening of the feed container;
wherein the at least one dividing knife and the bottom are each equipped with a heating device; and
wherein the heating device of the at least one dividing knife is configured to move with the at least one dividing knife as the at least one dividing knife moves between the first position and the second position.

2. The apparatus as claimed in claim 1, wherein walls of the feed container are equipped with a wall heating device.

3. The apparatus of claim 2, wherein the wall heating device includes a plurality of heating elements positioned in grooves within at least one of the walls of the feed container.

4. The apparatus as claimed in claim 1, wherein a vertical spacing between the bottom and the at least one dividing knife is variable.

5. The apparatus of claim 4, wherein the spacing between the at least one dividing knife and the discharge opening is variable.

6. The apparatus as claimed in claim 1, wherein the feed container comprises two sections which can be displaced telescopically with respect to one another, the bottom being arranged in a lower section and the at least one dividing knife being arranged in an upper section.

7. The apparatus as claimed in claim 1, wherein the at least one dividing knife comprises a plurality of dividing knives which are arranged above one another and can be moved horizontally independently of one another.

8. The apparatus as claimed in claim 1, wherein at least one of the at least one dividing knife and the bottom is equipped with a drive which is actuated by a control unit, and the actuation of the drive can be controlled by means of the control unit in a manner which is dependent on parameters which are measured by at least one sensor.

9. The apparatus of claim 8, wherein the at least one sensor is configured to determine if a level of carbon dioxide snow within the feed container has grown beyond a vertical position of the at least one dividing knife.

10. The apparatus as claimed in claim 1, wherein the bottom is equipped with two drives, of which a first drive makes a horizontal movement of the bottom possible and a second drive makes a vertical movement of the bottom possible.

11. The apparatus as claimed claim 1, wherein the internal cross section of the discharge opening and the external cross section of the bottom are of rectangular configuration.

12. An apparatus for filling coolant storage compartments of cooling containers with carbon dioxide snow for cooling foodstuffs during transport comprising:
a device for portioning the carbon dioxide snow; and
a channel feeding the carbon dioxide snow from the device for portioning the carbon dioxide snow into the coolant storage compartments;
wherein an apparatus as claimed in claim 1 is used as the device for portioning the carbon dioxide snow.

13. The apparatus of claim 12, wherein the channel is inclined and has a width that is at least as wide as the discharge opening.

14. The apparatus of claim 1, wherein the heating devices are configured to prevent carbon dioxide snow from caking onto the at least one dividing knife and the bottom.

15. The apparatus of claim 1, wherein at least one of the heating devices includes a plurality of heating elements arranged in parallel.

16. An apparatus for filling coolant storage compartments of cooling containers with carbon dioxide snow for cooling foodstuffs during transport comprising:
a device for portioning the carbon dioxide snow; and
a channel feeding the carbon dioxide snow from the device for portioning the carbon dioxide snow into the coolant storage compartments;
wherein the device for portioning the carbon dioxide snow comprises:
a feed container, into which a feed line for liquid or snowy carbon dioxide and a gas vent line for discharging carbon dioxide gas open, and which has a discharge opening which is arranged on the bottom side, and which is equipped with at least one dividing knife which is arranged spaced apart from the discharge opening and can be moved from a first position which separates an interior space of the feed container into two part volumes, into a second position which is spaced apart laterally from the interior space of the feed container;
wherein the discharge opening is assigned a horizontally and vertically movable bottom which has an external cross section which corresponds to an internal cross section of the discharge opening, and which bottom can be moved between a first position, in which the discharge opening is released and the bottom is arranged laterally on the feed container, a second position, in which the bottom closes the discharge opening at the level of its orifice, and a third position, in which the bottom is introduced to a limited extent into the discharge opening of the feed container; and
wherein the channel is inclined and has a width that is at least as wide as the discharge opening.

17. An apparatus for metering carbon dioxide snow comprising:
a feed container, into which a feed line for liquid or snowy carbon dioxide and a gas vent line for discharging carbon dioxide gas open, and which has a discharge opening which is arranged on the bottom side, and which is equipped with at least one dividing knife which is arranged spaced apart from the discharge opening and can be moved from a first position which separates an interior space of the feed container into two part volumes, into a second position which is spaced apart laterally from the interior space of the feed container;
wherein the discharge opening is assigned a horizontally and vertically movable bottom which has an external cross section which corresponds to an internal cross section of the discharge opening, and which bottom can be moved between a first position, in which the discharge opening is released and the bottom is arranged laterally on the feed container, a second position, in which the bottom closes the discharge opening at the level of its orifice, and a third position, in which the bottom is introduced to a limited extent into the discharge opening of the feed container;
wherein a vertical spacing between the bottom and the at least one dividing knife is variable; and
wherein the spacing between the at least one dividing knife and the discharge opening is variable.

18. An apparatus for metering carbon dioxide snow comprising:
a feed container, into which a feed line for liquid or snowy carbon dioxide and a gas vent line for discharging carbon dioxide gas open, and which has a discharge opening which is arranged on the bottom side, and which is equipped with at least one dividing knife which is arranged spaced apart from the discharge opening and can be moved from a first position which separates an interior space of the feed container into two part volumes, into a second position which is spaced apart laterally from the interior space of the feed container;

wherein the discharge opening is assigned a horizontally and vertically movable bottom which has an external cross section which corresponds to an internal cross section of the discharge opening, and which bottom can be moved between a first position, in which the discharge opening is released and the bottom is arranged laterally on the feed container, a second position, in which the bottom closes the discharge opening at the level of its orifice, and a third position, in which the bottom is introduced to a limited extent into the discharge opening of the feed container;

wherein at least one of the at least one dividing knife and the bottom is equipped with a drive which is actuated by a control unit, and the actuation of the drive can be controlled by means of the control unit in a manner which is dependent on parameters which are measured by at least one sensor; and wherein the at least one sensor is configured to determine if a level of carbon dioxide snow within the feed container has grown beyond a vertical position of the at least one dividing knife.

\* \* \* \* \*